United States Patent [19]
Kostko

[11] 3,769,899
[45] Nov. 6, 1973

[54] COOKING VESSEL
[76] Inventor: Nicholas M. Kostko, 3724 Raymond Ave., Brookfield, Ill. 60513
[22] Filed: Sept. 28, 1970
[21] Appl. No.: 76,198

[52] U.S. Cl. .................................. 99/324, 99/416
[51] Int. Cl. ............................................ A47j 39/00
[58] Field of Search ..................... 99/324, 345, 410, 99/414–415, 416–417, 446, 337; 206/4; 220/17; 126/369, 373

[56] References Cited
UNITED STATES PATENTS

| | | | |
|---|---|---|---|
| 230,274 | 7/1880 | Haskell | 99/416 UX |
| 1,341,960 | 6/1920 | Meyer et al. | 220/17 |
| 1,573,620 | 2/1926 | Allston | 206/4 |
| 1,740,205 | 12/1929 | Schmidt | 99/446 |
| 2,405,764 | 8/1946 | Smith | 220/17 X |

Primary Examiner—John Petrakes
Assistant Examiner—Arthur O. Henderson
Attorney—Nestro W. Shust

[57] ABSTRACT

A thermally insulated cooking container which comprises outer insulator and an inner container of jacketed construction containing between the two walls of the jacket a material having a high heat coefficient. The inner container is covered with a lid of similar construction to provide an air tight seal and an outer top of the same construction as the insulator which encompasses the inner lid and makes a tight fit with the insulator.

Also a method of cooking which comprises heating the pot with its contents to the boiling point of water, placing the pot in the insulated container and after covering, permitting it to stand, without applying heat, for a desired period of time.

1 Claim, 5 Drawing Figures

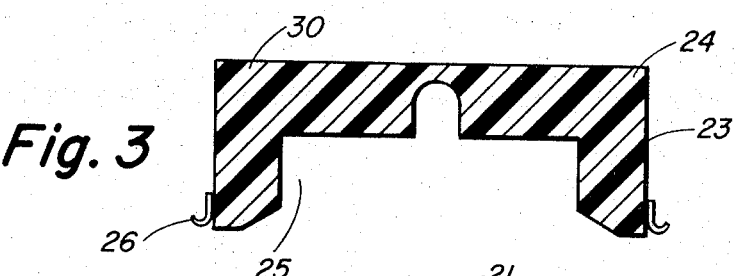
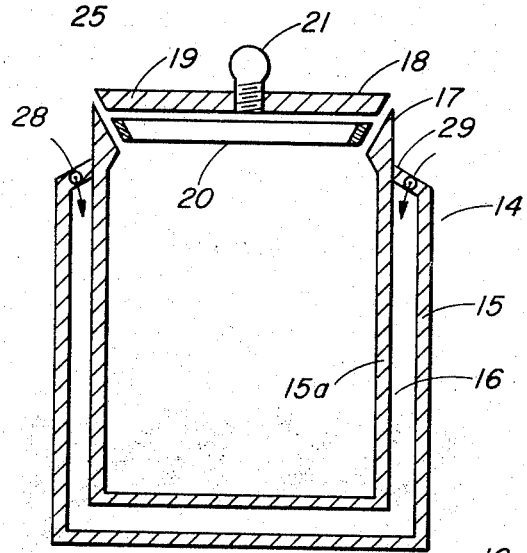
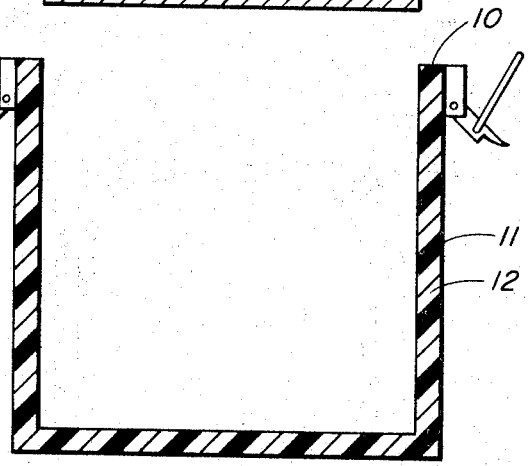
INVENTOR.
NICHOLAS M. KOSTKO
BY
ATTORNEY.
NESTOR W. SHUST

COOKING VESSEL

The present invention is directed to a novel cooking container and a method of cooking employing such a container.

The available cooking equipment is such that in the preparation of foods continuous heat must be applied. The disadvantages of the known methods are the need for constant attendance and for a source of continuous heat. Thus the object of the present invention is to provide a new cooking container a novel method of cooking which would not require a constant source of heat.

The above object is accomplished by a novel cooking container which is shown in the drawing in which:

FIG. 1 is a cross-section of the insulator;

FIG. 2 is a cross-section of the cooking container;

FIG. 3 is a cross-section of the insulator top;

Figure 4:
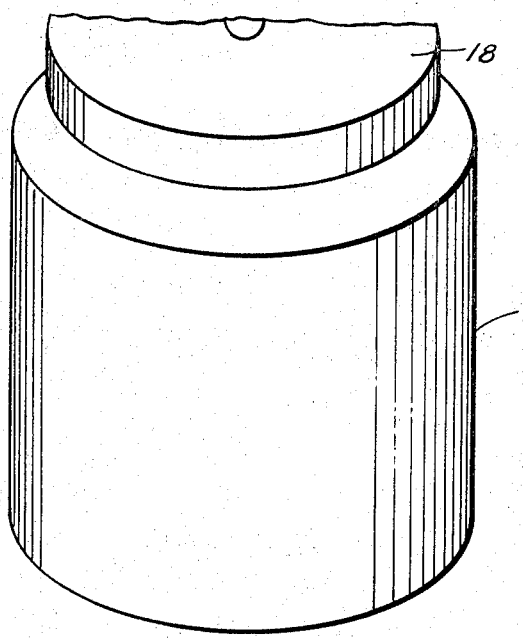
FIG. 4 is an exterior view of the insulator container the cooking container.
Figure 5:
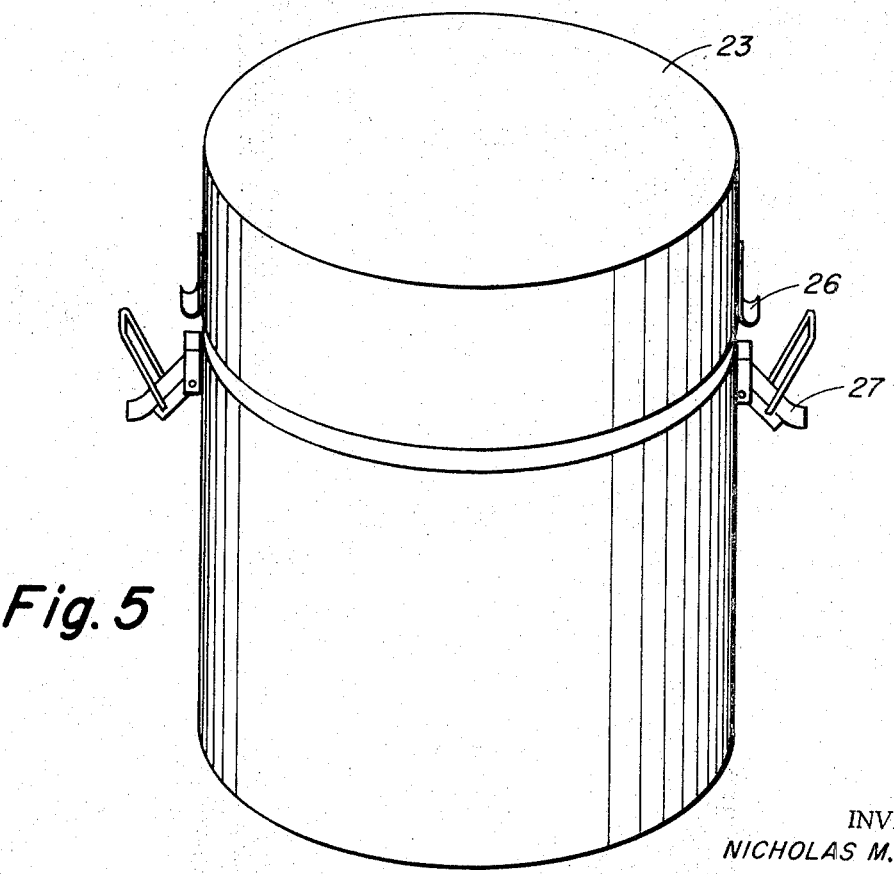
FIG. 5 is an exterior view of the fully assembled insulator unit.

In FIG. 1, the numeral 10 denotes an outer insulator which comprises an outer wall 11 and an insulating liner 12. The insulating liner 12, which is bonded or otherwise attached to the inside of the outer wall 11, is made of asbestos, expandable polystyrene beads, glass wool, mica or other insulating material. A pair of oppositely disposed clamps 27 are mounted on the outer metal wall.

In FIG. 2, the numeral 14 denotes an inner container of jacketed construction comprising an outer wall 15 and an inner wall 15a which contain between them liquid 16. The upper extremity of the outer wall 15 has a stepped portion 29 which meets with the inner wall 15a which protrudes further up forming a sloped base 17 adapted to receive the cover 18. In the stepped portion 29 is located a valve 28 through which a liquid 16 can be introduced between the outer wall 15 and inner wall 15a. Valve 28 also serves as a safety valve during the heating process. The cover 18 is made of the same construction as the inner container 14, comprising an outer wall 19 an inner wall 20 which is adapted to be received by the top portion of the inner container 14 and a rubber or teflon gasket on the edge of the inner wall creating a tight fit between the cover and the container. A convenient lifting means 21 can be incorporated in the cover either integrally or by subsequent attachment to the outer wall 19.

In FIG. 3, the numeral 23 denotes an outer insulator for the cover comprising an outer metal wall 30 and an insulating liner 24 which is bonded or otherwise attached to the inside of the outer metal wall 30. The insulating liner 24 is made of asbestos, expandable polystyrene beads, glass wool, mica or other insulating material. The void 25 is shaped in exactly the same way as the cover of the inner container 18 and when placed over it covers it fully. A pair of oppositely disposed hooks 26 are mounted on the outer wall so that when the outer container insulator 10 and the outer cover insulator 23 are brought together, the hooks 26 receive the clamps 27 locking both insulator together.

The outer wall 11 can be any materaial containing mechanical properties, such as wood, glass and, more preferably, a metal. The most useful metals are stainless steel, aluminum, copper or brass.

Liquid 16 can be any non-explosive and non-poisonous material having a high heat transfer coefficient. Preferably, liquid 16 is edible oil, melted paraffin, mineral oil or other such suitable material which is liquid between 0° and 100° C.

The inner container 14 can be made of stainless steel, aluminum, enameled metal or pyrex glass. It can also be made of mixed metals, such as aluminum and stainless steel, stainless steel and copper and the like.

The above described novel cooking container enables one to employ a novel cooking process which comprises placing the meal ingredients, water and seasoning into said cooking container, bringing the contents to boil and holding it at the boiling temperature for a short time to insure a uniform distribution of heat in the container. The boiling period varies from only a few moments up to about 15 minutes depending on the kind and size of the ingredients and the type of the liquid employed between the walls of the cooking container. At the end of the boiling period the container is covered and the cooking container is placed in the insulator which is also covered and the top and the bottom of the insulator are tightly clamped together. The assembled system is then permitted to stand without applying thereto any additional heat. The cooking time is between four and ten hours, depending on the density and hardness of the food being cooked. For example, a fresh vegetable stew and the more tender meats, such as beef, will be cooked in four to five hours, while dried beans, peas, barley or other dried or hard foods require eight to ten hours in order to be fully cooked.

The above cooking method is very valuable both from the convenience standpoint and from the health standpoint. Since the foods are cooked at temperatures below 212° F and in a closed system, the nutritive value as well as the natural aroma of the food ingredients are fully preserved. Furthermore, since the cooking method of the invention does not require a continuous heat source, the food can be cooking without any attendance. That means that full meals can be prepared long in advance and while the food is being cooked the cook can be away from home or can perform during this time, other assignments. Thus the novel cooking container and the method of cooking would be particularly useful for hikers, hunters, working wives and soldiers.

In addition to using the novel cooking container for cooking it can also be employed for keeping the precooked foods hot for long periods of time without any continuous, and often inconvenient, heat sources such as for example steam. Thus caferterias and resturants can keep the precooked meals hot for the extended period of time when the meals are being served. Similarly, meals prepared in central kitchens can be conveniently kept hot while it is delivered to the workers or soldiers in the field.

In the above description of the cooking container and the method of cooking, the invention has been described in the preferred embodiments. This invention, however, is not limited to the exact embodiments illustrated since various modifications can be made without departing from the spirit of the invention and the appended claims.

What is claimed is:

1. A thermally insulated structure comprising an inner container of jacketed construction capable of being heated on a direct flame having a main body portion and an inner cover portion, said body portion having an outer wall and an inner wall forming a hollow space between them, said space being filled with a material of a high heat transfer coefficient; a valve member located in the upper portion of said inner container such that said hollow space can be filled with said material through said valve which, when closed, serves as a safety valve; the upper extremity of said inner wall extending beyond and above said outer wall forming a sloped base adapted to receive said inner cover portion so that when seated on said sloped base a substantially airtight enclosure is formed; said inner cover comprising of an insulating liner uniformly fastened to the inner wall of said inner cover; an outer insulator member of a sufficient size to receive said inner container and an outer insulator cover of a size and shape capable to enclose said inner cover portion, said outer insulator member and outer insulator cover each having a pair of oppositely disposed clamps mounted on the outside walls so that when said clamps are locked, a tight fit between the outer insulator and the outer cover is formed.

* * * * *